(12) United States Patent
Basse et al.

(10) Patent No.: US 8,978,084 B2
(45) Date of Patent: Mar. 10, 2015

(54) PRESENTATION MODES FOR VARIOUS FORMAT BIT STREAMS

(71) Applicant: The DIRECTV Group, Inc., El Segundo, CA (US)

(72) Inventors: Hanno Basse, Santa Monica, CA (US); John L. Norin, Redondo Beach, CA (US); Raynold M. Kahn, Los Angeles, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 0 days.

(21) Appl. No.: 13/768,116

(22) Filed: Feb. 15, 2013

(65) Prior Publication Data
US 2013/0198404 A1    Aug. 1, 2013

Related U.S. Application Data (62) Division of application No. 11/810,774, filed on Jun. 7, 2007, now abandoned.

(60) Provisional application No. 60/812,197, filed on Jun. 9, 2006.

(51) Int. Cl.
| | |
|---|---|
| *H04N 7/173* | (2011.01) |
| *H04L 29/06* | (2006.01) |
| *H04N 7/10* | (2006.01) |
| *H04N 7/16* | (2011.01) |
| *H04N 7/20* | (2006.01) |
| *H04N 21/436* | (2011.01) |
| *H04N 21/442* | (2011.01) |

(Continued)

(52) U.S. Cl.
CPC .............. *H04L 65/60* (2013.01); *H04N 7/106* (2013.01); *H04N 7/16* (2013.01); *H04N 7/20* (2013.01); *H04N 21/43615* (2013.01); *H04N 21/44231* (2013.01); *H04N 21/4882* (2013.01); *H04N 21/6143* (2013.01)
USPC ........... 725/110; 725/139; 725/131; 725/109; 725/118

(58) Field of Classification Search
USPC .......................... 725/110, 131, 139, 109, 118
See application file for complete search history.

(56) References Cited

U.S. PATENT DOCUMENTS

| | | | |
|---|---|---|---|
| 6,441,793 B1 | 8/2002 | Shea | |
| 6,647,015 B2 * | 11/2003 | Malkemes et al. | 370/401 |
| 6,678,737 B1 * | 1/2004 | Bucher | 709/231 |

(Continued)

FOREIGN PATENT DOCUMENTS

| | | |
|---|---|---|
| WO | 02/25847 A1 | 3/2002 |

OTHER PUBLICATIONS

Non-final Office action dated May 13, 2013 in U.S. Appl. No. 11/219,407, filed Sep. 2, 2005 by Thomas H. James et al.

(Continued)

*Primary Examiner* — Olugbenga Idowu (57) ABSTRACT

A system, method, and apparatus for processing media content for display on a monitor. A home media center (HMC), that includes a server receiver, acts as a central location for recording, distribution, and scheduling of tasks and system resources. The HMC receives a client request from a first client receiver and a legacy request or informs the receiver that the request cannot be fulfilled. Different coding technologies are used to provide video, audio, and data services to the client receiver and the legacy receiver.

16 Claims, 7 Drawing Sheets

(51) Int. Cl.
*H04N 21/488* (2011.01)
*H04N 21/61* (2011.01)

(56) References Cited

U.S. PATENT DOCUMENTS

| | | | |
|---|---|---|---|
| 7,240,357 | B1 | 7/2007 | Arsenault et al. |
| 7,369,750 | B2 * | 5/2008 | Cheng et al. .................. 386/292 |
| 7,970,341 | B2 | 6/2011 | Fitzpatrick et al. |
| 8,001,574 | B2 | 8/2011 | Hicks et al. |
| 2002/0019984 | A1 | 2/2002 | Rakib |
| 2003/0097563 | A1 | 5/2003 | Moroney et al. |
| 2003/0192053 | A1 | 10/2003 | Sheppard et al. |
| 2004/0123329 | A1 | 6/2004 | Williams et al. |
| 2004/0244059 | A1 * | 12/2004 | Coman ......................... 725/139 |
| 2004/0268408 | A1 | 12/2004 | Lee et al. |
| 2005/0071877 | A1 | 3/2005 | Navarro |
| 2005/0130590 | A1 | 6/2005 | Pande et al. |
| 2006/0143673 | A1 | 6/2006 | Okamoto |
| 2009/0222875 | A1 * | 9/2009 | Cheng et al. .................. 725/147 |
| 2010/0313238 | A1 | 12/2010 | Baumgartner et al. |

OTHER PUBLICATIONS

Final Rejection dated Jul. 31, 2013 in U.S. Appl. No. 13/117,680, filed May 27, 2011 by Thomas H. James et al.
Non-final Office action dated Jul. 31, 2013 in U.S. Appl. No. 13/093,642, filed Apr. 25, 2011 by Thomas H. James et al.
Non-final Office action dated Jun. 19, 2013 in U.S. Appl. No. 12/127,718, filed May 27, 2008 by John L. Norin.
Final Rejection dated Feb. 8, 2013 in U.S. Appl. No. 11/820,446, filed Jun. 19, 2007 by Thomas H. James et al.
Non-final Office action dated Dec. 20, 2012 in U.S. Appl. No. 13/093,642, filed Apr. 25, 2011 by Thomas H. James et al.
Notice of Allowance dated Mar. 14, 2013 in U.S. Appl. No. 11/097,724, filed Apr. 1, 2005 by Thomas H. James et al.
Non-final Office action dated Mar. 21, 2013 in U.S. Appl. No. 13/212,341, filed Aug. 18, 2011 by Thomas H. James et al.
Final Rejection dated Apr. 3, 2013 in U.S. Appl. No. 13/093,642, filed Apr. 25, 2011 by Thomas H. James et al.
Final Rejection dated Apr. 18, 2013 in U.S. Appl. No. 13/566,193, filed Aug. 3, 2012 by Robert F. Popoli.
Final Rejection dated Oct. 7, 2013 in U.S. Appl. No. 11/219,407, filed Sep. 2, 2005 by Thomas H. James et al.
Final Rejection dated Oct. 25, 2013 in U.S. Appl. No. 11/820,446, filed Jun. 19, 2007 by Thomas H. James et al.
Notice of Allowance dated Nov. 6, 2013 in U.S. Appl. No. 13/117,680, filed May 27, 2011 by Thomas H. James et al.
Notice of Allowance dated Oct. 30, 2013 in U.S. Appl. No. 13/212,341, filed Aug. 18, 2011 by Thomas H. James et al.
Non-final Office action dated Sep. 24, 2013 in U.S. Appl. No. 13/223,204, filed Aug. 31, 2011 by John Norin et al.
Notice of Allowance dated Dec. 13, 2013 in U.S. Appl. No. 12/127,718, filed May 27, 2008 by John L. Norin.
Notice of Allowance dated Aug. 22, 2013 in U.S. Appl. No. 13/566,193, filed Aug. 3, 2012 by Robert F. Popoli.
Notice of Allowance dated Aug. 23, 2013 in U.S. Appl. No. 11/097,481, filed Apr. 1, 2005 by Thomas H. James et al.
Notice of Allowance dated May 14, 2014 in U.S. Appl. No. 14/042,599, filed Sep. 30, 2013 by Thomas H. James et al.
EPO communication dated Aug. 14, 2014 in European Patent Application No. 06749155.5 filed Apr. 3, 2006 by Thomas H. James et al.
STMicroelectronics; "SaTCR-1 Satellite Channel Router"; Oct. 1, 2004; XP055133313; retrieved from the internet URL:http://www.st.com/st-web-ui/static/active/en/resource/technical/document/data_brief/CD00022121.pdf [retrieved on Aug. 5, 2014].
Notice of Allowance dated Mar. 18, 2014 in U.S. Appl. No. 11/219,407, filed Sep. 2, 2005 by Thomas H. James et al.

* cited by examiner

PRESENTATION MODES FOR VARIOUS FORMAT BIT STREAMS

CROSS REFERENCE TO RELATED APPLICATIONS

This application is a divisional application of U.S. patent application Ser. No. 11/810,774, filed on Jun. 7, 2007, by Hanno Basse et al., entitled "PRESENTATION MODES FOR VARIOUS FORMAT BIT STREAMS," which application claims the benefit under 35 U.S.C. §119(e) to U.S. Provisional Patent Application Ser. No. 60/812,197, filed on Jun. 9, 2006, by Hanno Basse et al., entitled "PRESENTATION MODES FOR VARIOUS FORMAT BIT STREAMS," all of which applications are hereby incorporated by reference herein.

BACKGROUND OF THE INVENTION

1. Field of the Invention

The present invention relates generally to a satellite signal delivery system, and in particular, to presentation of various format bit streams within a satellite signal delivery system.

2. Description of the Related Art

Satellite broadcasting of communications signals has become commonplace. Satellite distribution of commercial signals for use in television programming currently utilizes multiple feedhorns on a single Outdoor Unit (ODU) which supply signals to up to eight IRDs on separate cables from a multiswitch.

Figure 1:
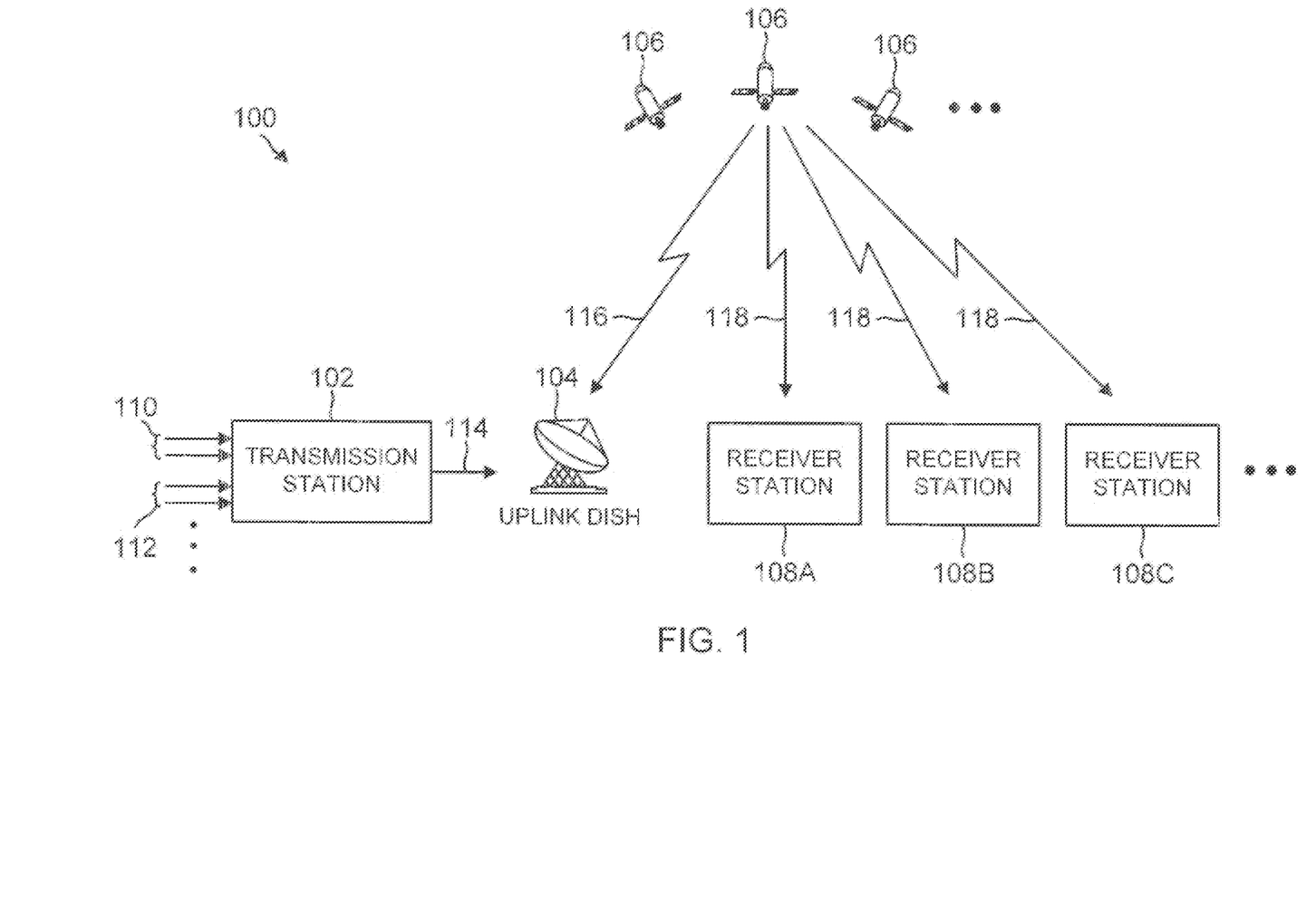
FIG. 1 illustrates a typical satellite system of the related art.

FIG. 1 illustrates a typical satellite television system of the related art.

FIG. 1 shows a communications system, specifically a television broadcasting system 100, which transmits and receives audio, video, and data signals via satellite. Although the present invention is described in the context of a satellite-based television broadcasting system, the techniques described herein are equally applicable to other methods of program content delivery, such as terrestrial over-the-air systems, cable-based systems, and the Internet. Further, while the present invention will be described primarily with respect to television content (i.e. audio and video content), the present invention can be practiced with a wide variety of program content material, including video content, audio content, audio and video related content (e.g., television viewer channels), or data content (e.g., computer data).

Television broadcasting system 100 includes transmission station 102, uplink dish 104, at least one satellite 106, and receiver stations 108A-108C (collectively referred to as receiver stations 108). Transmission station 102 includes a plurality of inputs 110 for receiving various signals, such as analog television signals, digital television signals, video tape signals, original programming signals and computer generated signals containing HTML content. Additionally, inputs 110 receive signals from digital video servers having hard discs or other digital storage media. Transmission station 102 also includes a plurality of timing inputs 112, which provide electronic schedule information about the timing and content of various television channels, such as that found in television schedules contained in newspapers and television guides. Transmission station 102 converts the data from timing inputs 112 into program guide data. Program guide data may also be manually entered at the site of transmission station 102. The program guide data consists of a plurality of "objects". The program guide data objects include data for constructing an electronic program guide that is ultimately displayed on a user's television.

Transmission station 102 receives and processes the various input signals received on inputs 110 and timing inputs 112, converts the received signals into a standard form, combines the standard signals into a single output data stream 114, and continuously sends output data stream 114 to uplink dish 104. Output data stream 114 is a digital data stream that is typically compressed using MPEG2 encoding, although other compression schemes may be used.

The digital data in output data stream 114 are divided into a plurality of packets, with each such packet marked with a Service Channel Identification (SCID) number. The SCIDs can be used by a receiver in receiver station 108 to identify the packets that correspond to each television channel. Error correction data is also included in output data stream 114.

Output data stream 114 is typically a multiplexed signal that is modulated by transmission station 102 using standard frequency and polarization modulation techniques. Output data stream 114 preferably includes a plurality of frequency bands, typically sixteen frequency bands, with each frequency band being either left polarized or right polarized. Alternatively, vertical and horizontal polarizations may be used.

Uplink dish 104 continuously receives output data stream 114 from transmission station 102, amplifies the received signal and transmits signal 116 to at least one satellite 106. Although a single uplink dish 104 and three satellites 106 are shown in FIG. 1, multiple uplink dishes 104 and a larger number of satellites 106 are preferably used to provide additional bandwidth, and to help ensure continuous delivery of signals 114 to receiver stations 108.

Satellites 106 revolve in geosynchronous orbit around the earth. Satellites 106 each include a plurality of transponders that receive signals 116 transmitted by uplink dish 104, amplify the received signals 116, frequency shift the received signals 116 to different frequency bands, and then transmit the amplified, frequency shifted signals 118 back to desired geographic areas on the Earth, where receiver stations 108 are located or will be located at some time in the future. Receiver stations 108 then receive and process the signals 118 transmitted by satellites 106.

Each satellite 106 typically broadcasts signals 118 in thirty-two (32) different frequencies, which are licensed to various users for broadcasting of programming, which can be audio, video, or data signals, or any combination. These signals are typically located in the Ku-band of frequencies, i.e., 11-18 GHz range, but can be broadcast in the Ka-band of frequencies, i.e., 18-40 GHz, more typically in the 20-30 GHz range, or other frequency bands.

Figure 2:
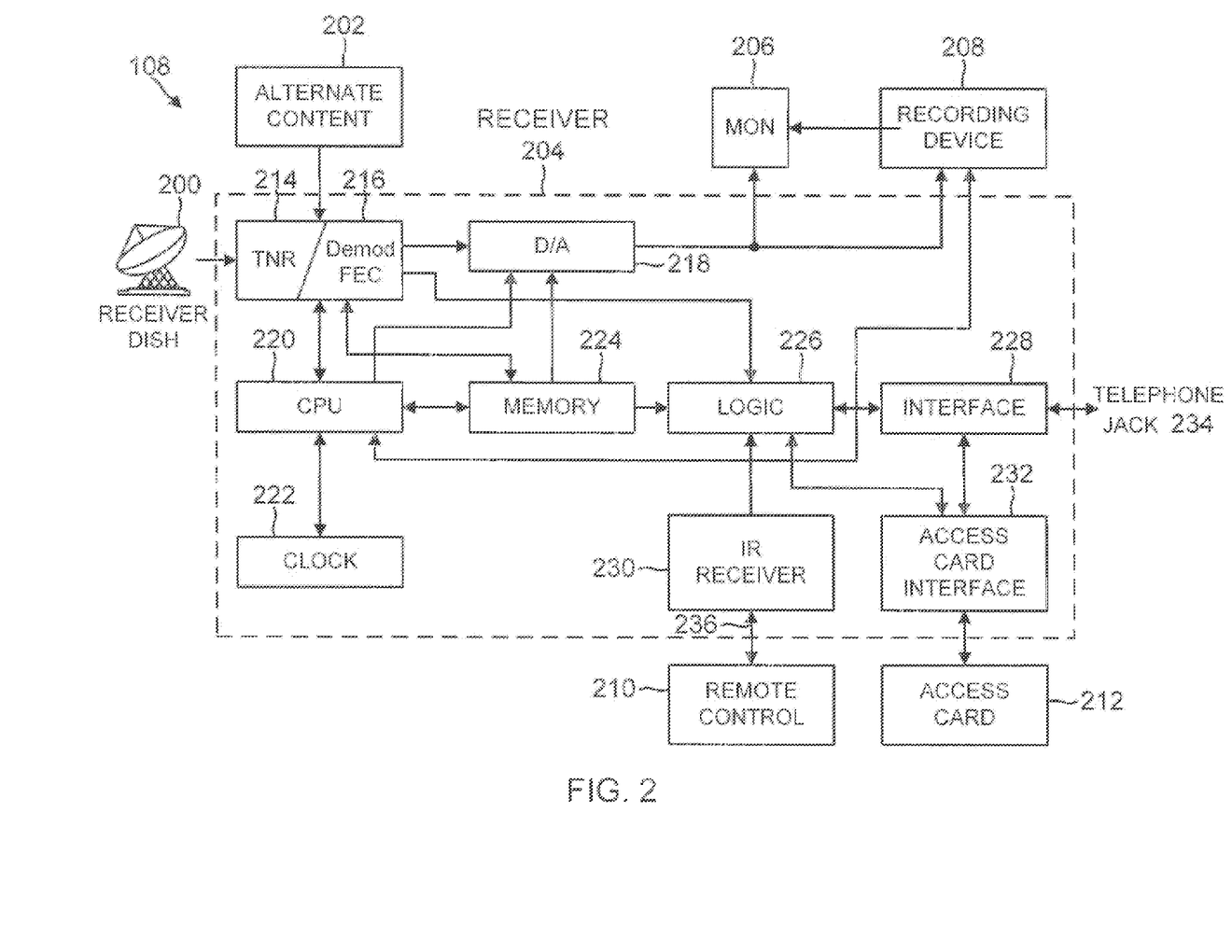
FIG. 2 illustrates a typical receiver of the related art.

FIG. 2 is a block diagram of one of receiver stations 108, which receives and decodes audio, video and data signals. Typically, receiver station 108 is a "set top box," also known as an Integrated Receiver Decoder (IRD), which is usually resident in a home or multi-dwelling unit, for reception of satellite broadcasted television signals 118.

Receiver dish 200 can be an Outdoor Unit (ODU), which is usually a smaller dish antenna mounted on a home or multi-dwelling unit. However, receiver dish 200 can also be a larger ground-mounted antenna dish if desired.

Receiver dish 200 typically uses a reflector dish and feedhorn assembly to receive and direct downlink signals 118 to receiver station 108 via a wire or coaxial cable. Each receiver station has a dedicated cable that allows receiver dish 200, via a multiswitch, to selectively direct downlink signals 118 to receiver station 108, and allows receiver station 108 to determine which of the signals 118 is desired.

Receiver station 108 includes receiver dish 200, alternate content source 202, receiver 204, monitor 206, recording device 208, remote control 210 and access card 212. Receiver 204 includes tuner 214/demodulator/Forward Error Correction (FEC) decoder 216, digital-to-analog (D/A) converter 218, CPU 220, clock 222, memory 224, logic circuit 226, interface 228, infrared (IR) receiver 230 and access card interface 232. Receiver dish 200 receives signals 118 sent by satellites 106, amplifies the signals 118 and passes the signals 118 on to tuner 214. Tuner 214 and demodulator/FEC decoder 216 operate under control of CPU 220.

The CPU 220 operates under control of an operating system stored in the memory 224 or within an auxiliary memory within the CPU 220. The functions performed by CPU 220 are controlled by one or more control programs or applications stored in memory 224. Operating system and applications are comprised of instructions which, when read and executed by the CPU 220, cause the receiver 204 to perform the functions and steps necessary to implement and/or use the present invention, typically, by accessing and manipulating data stored in the memory 224. Instructions implementing such applications are tangibly embodied in a computer-readable medium, such as the memory 224 or the access card 212. The CPU 220 may also communicate with other devices through interface 228 or the receiver dish 200 to accept commands or instructions to be stores in the memory 224, thereby making a computer program product or article of manufacture according to the invention. As such, the terms "article of manufacture," "program storage device" and "computer program product" as used herein are intended to encompass any application accessible by the CPU 220 from any computer readable device or media.

Memory 224 and access card 212 store a variety of parameters for receiver 204, such as a list of channels receiver 204 is authorized to process and generate displays for; the zip code and area code for the area in which receiver 204 is used; the model name or number of receiver 204; a serial number of receiver 204; a serial number of access card 212; the name, address and phone number of the owner of receiver 204; and the name of the manufacturer of receiver 204.

Access card 212 is removable from receiver 204 (as shown in FIG. 2). When inserted into receiver 204, access card 212 is coupled to access card interface 232, which communicates via interface 228 to a customer service center (not pictured). Access card 212 receives access authorization information from the customer service center based on a user's particular account information. In addition, access card 212 and the customer service center communicate regarding billing and ordering of services.

Clock 222 provides the current local time to CPU 220. Interface 228 is preferably coupled to a telephone jack 234 at the site of receiver station 108. Interface 228 allows receiver 204 to communicate with transmission station 102 as shown in FIG. 1 via telephone jack 234. Interface 228 may also be used to transfer data to and from a network, such as the Internet.

The signals sent from receiver dish 200 to tuner 214 are a plurality of modulated Radio Frequency (RF) signals. The desired RF signal is then downconverted to baseband by the tuner 214, which also generates in-phase and quadrature-phase (I and Q) signals. These two signals are then passed to the demodulator/FEC Application Specific Integrated Circuit (ASIC) 216. The demodulator 216 ASIC then demodulates the I and Q signals, and the FEC decoder correctly identifies each transmitted symbol. The received symbols for Quaternary Phase Shift Keying (QPSK) or 8 PSK signals carry two or three data bits, respectively. The corrected symbols are translated into data bits, which in turn are assembled in to payload data bytes, and ultimately into data packets. The data packets may carry 130 data bytes or 188 bytes (187 data bytes and 1 sync byte).

In addition to the digital satellite signals received by receiver dish 200, other sources of television content are also preferably used. For example, alternate content source 202 provides additional television content to monitor 206. Alternate content source 202 is coupled to tuner 214. Alternate content source 202 can be an antenna for receiving off the air signals National Television Standards Committee (NTSC) signals, a cable for receiving American Television Standards Committee (ATSC) signals, or other content source. Although only one alternate content source 202 is shown, multiple sources can be used. Initially, as data enters receiver 204, CPU 220 looks for initialization data which is referred to commonly in the industry as a boot object. A boot object identifies the SCIDs where all other program guide objects can be found. Boot objects are always transmitted with the same SCID, so CPU 220 knows that it must look for packets marked with that SCID. The information from the boot object is used by CPU 220 to identify packets of program guide data and route them to memory 224.

Remote control 210 emits Infrared (IR) signals 236 that are received by infrared receiver 230 in receiver 204. Other types of data entry devices may alternatively be used, by way of example and not limitation, such as an ultra-high frequency (UHF) remote control, a keypad on receiver 204, a remote keyboard and a remote mouse. When a user requests the display of a program guide by pressing the "guide" button on remote control 210, a guide request signal is received by IR receiver 230 and transmitted to logic circuit 226. Logic circuit 226 informs CPU 220 of the guide request. In response to the guide request, CPU 220 causes memory 224 to transfer a program guide digital image to D/A converter 218. D/A converter 218 converts the program guide digital image into a standard analog television signal, which is then transmitted to monitor 206. Monitor 206 then displays the TV video and audio signals. Monitor 206 may alternatively be a digital television, in which case no digital to analog conversion in receiver 204 is necessary.

Users interact with the electronic program guide using remote control 210. Examples of user interactions include selecting a particular channel or requesting additional guide information. When a user selects a channel using remote control 210, IR receiver 230 relays the user's selection to logic circuit 226, which then passes the selection on to memory 224 where it is accessed by CPU 220. CPU 220 performs an MPEG2 decoding step on received audio, video, and other packets from FEC decoder 216 and outputs the audio and video signals for the selected channel to D/A converter 218. D/A converter 218 converts the digital signals to analog signals, and outputs the analog signals to monitor 206.

As the number of satellites 106 increases, the number of programming choices increases. Further, as users add additional television monitors 206 to a home, each monitor 206 requires, in the related art system, a dedicated cable from receiver 204 to receiver dish 200, for control and delivery of downlink signals 118. This creates difficulties for users in terms of running additional cables and adding possibly unnecessary receiver 204 hardware in a given receiver station 108 installation.

It can be seen, then, that there is a need in the art for a more intelligent satellite data delivery system.

SUMMARY OF THE INVENTION

To minimize the limitations in the prior art, and to minimize other limitations that will become apparent upon reading and understanding the present specification, the present invention discloses a system and method for displaying various mode bit streams.

A system in accordance with the present invention comprises an antenna, a server receiver, coupled to the antenna, and at least one client receiver, coupled to the server receiver, wherein the client receiver sends commands to the antenna and receives signals from the antenna through the server receiver.

Other features and advantages are inherent in the system and method claimed and disclosed or will become apparent to those skilled in the art from the following detailed description and its accompanying drawings.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which show, by way of illustration, several embodiments of the present invention. It is understood that other embodiments may be utilized and structural changes may be made without departing from the scope of the present invention.

System Overview

Figure 3:
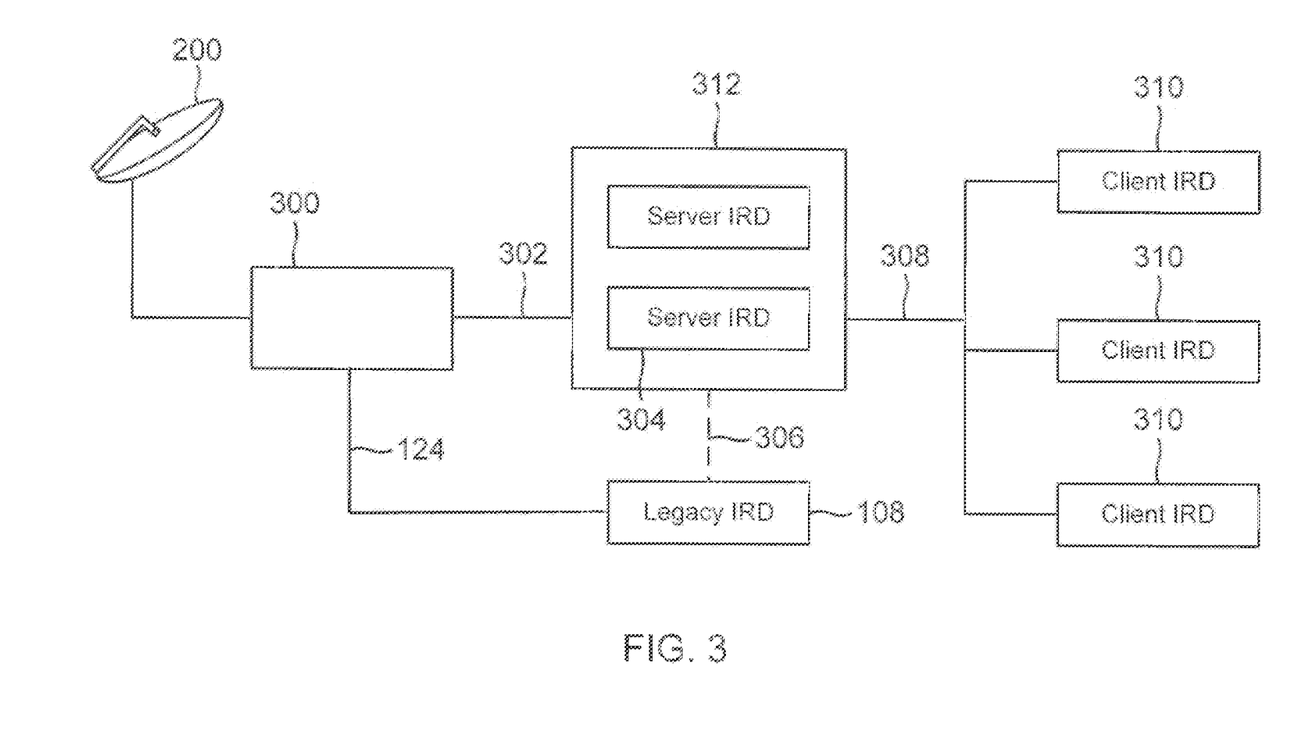
FIG. 3 illustrates a system diagram of the present invention.

FIG. 3 illustrates a system diagram of the present invention.

In the present invention, ODU 200 is coupled to Frequency Translation Module (FTM) 300. FTM 300 is coupled via cable 302 to Server IRD 304. FTM 300 is also coupled to legacy IRD 108 via cable 124, although, alternatively, Legacy IRD 108 can be coupled to Server IRD 304 via cable 306. Server IRD 304 is further coupled via cable 308 to Client IRDs 310. There can be more than one server IRD 304 in a given location if desired. One or more server IRDs 304 are also called a "Home Media Center" (HMC) 312.

HMC 312 acts as a central location for recording, distribution, and scheduling of tasks and system resources for the present invention. HMC 312 allocates resources to client IRDs 310 as needed, depending on the client IRD 310 requests sent to HMC 312 via cable 308.

Client IRD 310 makes requests for recording events, specific channels to view, and other system resources to HMC 312. HMC 312 processes all of the requests from all Client IRDs 310, and any legacy IRDs 108, and either fulfills the request or informs the user of a given IRD 310 that the request cannot be fulfilled. For example, if a user of a given client IRD 310 wants to record a program, and the HMC 312 is using the Digital Video Recorder (DVR) for another purpose, the HMC 312 would inform the user of the given client IRD 310 that the DVR is unavailable at the present time. HMC 312 can also provide the user with options to assist in fulfilling the request, such as telling the user when the DVR would be available, what the DVR is recording so that the user can choose to override the current DVR usage, or allow the user to make other resource allocations to allow for the present request to be fulfilled.

The two-way communication between HMC 312 and client IRD 310 takes place via cable 308, or via other wiring, such as power distribution lines or phone lines that are present within house 110.

Overview

The HMC 312 allows for Digital Video Recording functionality to every TV in house 110 without having a DVR present in every client IRD 310. The HMC 312 comprises one or more server IRDs 304 that act as a central hub. A Server IRD 304 receives and optionally records programming received from the satellite signals received by ODU 200. One or more client IRDs 310 connect to the HMC 312 via one or more cables 308 in order to receive audio, video and data and display these to a television monitor.

The HMC 312, via server IRD 304, is a high-definition (HD) receiver based on MPEG-2 or MPEG-4 transport streams, in addition to other proprietary formats used for legacy IRD 108. The HMC 312 also introduces Advanced modulation/Coding (AMC), which includes Low Density Parity Check (LDPC) coding.

LDPC coding with advanced modulation is a forward-error-correcting (FEC) code technique that outperforms conventional FEC (Reed-Solomon/Viterbi) coding schemes. LDPC coding provides a more bandwidth-efficient way to improve the bit-error rate of digital signals. The advanced modulation also provides higher Phase Shift Key (PSK) modulations. In PSK modulation, the carrier signal is transmitted in different phases according to the bit mapping. With 8 PSK, the number of phases is increased to eight to double the amount of information carried in the same bandwidth as a QPSK transmission.

The HMC 312 utilizes the MPEG-2 transport format and Advanced Modulation/LDPC coding and FTM 300 technologies to provide video, audio and data services to every monitor in house 110.

Advanced Modulation/Coding

The HMC 312 tunes to different satellite data streams, some with QPSK modulation and the Reed-Solomon FEC, and others using the FEC and other Advanced Modulation/Coding technologies, to provide the desired signals to each of the client IRDs 310 present in house 310. This requires the HMC 312 to use at least two different sets of tuning parameters depending upon the satellite stream type that is to be decoded and used. For a legacy stream type, i.e., the QPSK modulation stream, the tuning parameters are network id, frequency, polarization, SCID (12 bits), modulation type and FEC type. For an advanced modulation stream, i.e., "A3 stream" type, the tuning parameters are network id, frequency, polarization, PID (13 bits), mode id, symbol rate, roll off factor, physical layer header unique word (PLH_UW), gold code sequence scrambler and pilot indicator.

Comparing the two types of data streams, it is seen that the A3 stream coding parameters are mode id, symbol rate, roll off factor, physical layer header unique word, gold sequence scrambler and pilot indicator. each of these parameters is described below.

Mode Id

There are a total of 28 modulation/coding modes supported by the A3 advanced demodulation and decoding methodology. Each of these modes varies the modulation type (i.e., QPSK or 8 PSK), the FEC algorithm (i.e., Reed-Solomon (RS) or Low Density Parity Check/Bose, Chaudhuri, Hocquenghem (LDPC/BCH)) and the amount of FEC (i.e., $\frac{1}{4}$, $\frac{1}{2}$, $\frac{3}{5}$, $\frac{2}{3}$, $\frac{3}{4}$, $\frac{4}{5}$, $\frac{5}{6}$, $\frac{6}{7}$, $\frac{8}{9}$ and $\frac{9}{10}$).

Symbol Rate

The Symbol Rate defines the bandwidth capacity of a QPSK or 8 PSK modulation signal. The symbol rate can have a value of 20 MSymbols/s for all legacy transport streams and 20 MSymbols/s or 30 MSymbols/s for all non-legacy transport streams.

Roll Off Factor

The roll-off factor ($\alpha$) is used for filtering the signal using a baseband square root raised cosine factor. The roll-off factor can have values of 0.20, 0.25 and 0.35.

Physical Layer Header Unique Word

The Physical Layer Header (PLHEADER) is a 90-bit header applied to each 64,800-bit FEC frame. The PLHEADER consists of a 26-bit Start-of-Frame (SOF) and a unique 64-bit Physical Layer Signal (PLS) code. The SOF is fixed as 0x18D2E82. The PLS code can vary for each transport stream. A 90-bit PLH_UW is XOR'd with the PLHEADER. PLHEADER is not used in the legacy and DVBS modes, and is used in the QPSK and 8 PSK advanced modes Gold Sequence Scrambler The Gold Sequence Scrambler is an 18-bit value used to randomize the modulation phase (I,Q) for transmission of symbols in an FEC frame. The Gold Sequence Scrambler is used on each FEC frame excluding the PLHEADER. The Gold Sequence Scrambler is not used in the legacy and DVBS modes. It's only used in the QPSK and 8 PSK adavanced modes Pilot Indicator The pilot indicator is a 1-bit field indicating whether pilot symbols have been inserted in an FEC frame. Pilot symbols assist in carrier tracking by inserting an un-modulated raster of 36 symbols every 1440 symbols in an FEC frame. The pilot-less transmnission mode is also available with the advantage of offering an additional 2% useful capacity. Pilot symbols are not used in the legacy and DVBS modes. They are only used in the QPSK and 8 PSK advanced modes.

Interactions Between Server and Client

In the present invention, HMC 312 (via server IRD 304) and client IRDs 310 must interact to allow each of the client IRDs 310 to receive the data stream (e.g., desired television channel audio and video stream) that is being requested at that client IRD 310, as well as any other services being requested by the client IRD 310. For example, a given IRD 310 can send a request to HMC 312 to view a specific channel, record that channel, record a program that is occurring at a later time, purchase a pay-per-view event, purchase a movie to be recorded onto the DVR, and other requests. The HMC 312 coordinates all of these requests from all of the client IRDs 310 connected to the HMC 312, and resolve any conflicts between the requests via reporting the conflicts to the user and allowing the user to manually select system resources to fulfill the requests as best as possible.

Figure 4:
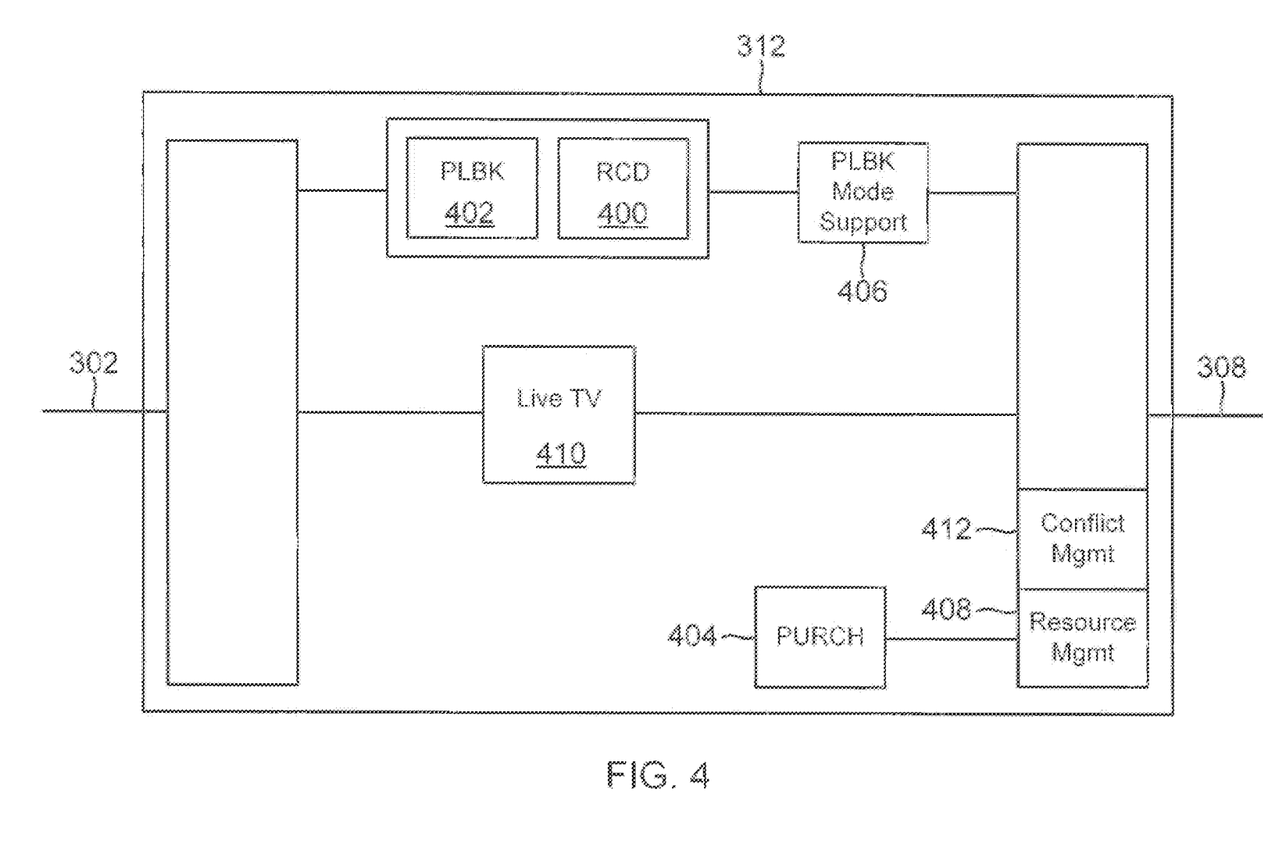
FIG. 4 illustrates a block diagram of the services provided by the home media center of the present invention.

FIG. 4 illustrates a block diagram of the services provided by the home media center of the present invention.

Several types of services are provided via HMC 312. Such services include recording services 400, playback services 402, purchase services 404, playback mode support 406, and resource management 408, and live television services 410, which are described with respect to FIG. 4.

Recording Services

The Recording Service 400 receives blocking and recording requests from the Client IRD 310 and the Server IRD 304. The recording service 400 makes a determination of the events to record based on response received from other components (e.g., resource manager 408, etc.) The Recording service 400 via a DVR Writer records the booked event and all associated metadata at the scheduled start time and for the specified duration. The status of the recording is reported to the Playback mode support 406 for viewing by a user.

The Recording Service 400 allows the viewer to purchase and record events. The Recording Service processes incoming booking requests locally or over the network from both Home Media Servers 304 and Home Media Clients 310. The types of events that may be booked include mandatory and optional software downloads, single (explicit) event recording, recurring event recording, opt-in recording, network scheduled (push) recording, manual recording, recurring manual recordings, find recordings, recording extensions, deletion of booked events, and prioritization of recurring events.

The Recording Service 400 interfaces with the Resource Manager 408 to resolve scheduling conflicts for requested events. The Recording Service 400 interfaces with the Resource Manager 408 to reserve the necessary resources for recording the requested event. The Recording Service 400 maintains a conflict-free list of pending booked events and synchronizes this list across all Clients 310 and Servers 304 in the Home Media network. The Recording Service 400 links the events in the pending list to the resources reserved and managed by the Resource Manager 408. The Recording Service 400 manages the content stored on the local drive, removing content when the drive reaches capacity. The Recording Service 400 stores the metadata necessary for the viewer to view and purchase a recording. The Recording Service 400 initiates the recording of a booked event at the scheduled start time and duration or booked events when the APG database is updated. The Recording Service 400 updates the playback Manager 406 with events that are available for viewing.

Home Media Clients 310 and Home Media Servers 304 use the Recording Service 400 to book events, delete booked events, prioritize booked events and delete content from the Server.

All client 310 requests are received by a "Recording Proxy Service" local to the Client 310 initiating the request. The Recording Proxy is responsible for communicating requests between Client 310 and Server 304 over the Home Media Network.

Upon receiving a booking request from a Client 310 or Server 304 the Recording Service 400 requests the Resource Manager 408 to reserve the resources necessary for the recording. The resource manager 408 interfaces with the Conflict Resolver 412 to perform the necessary conflict resolution on behalf of the Recording Service 400. If no conflicts exist and the resources are available the resource Manager 408 will reserve a resource bundle (a "video pipeline", which includes the tuner, demultiplexer and necessary disk space) to handle that request. The event is booked when no conflicts exist, or all conflicts are resolved (either automatically or via the viewer) and the resources necessary for recording are reserved.

The Recording Service 400 maintains an internal conflict-free list of booked events. The Recording Service 400 queries the available resources and other metadata associated with network recorded data (such as the APG) and stores and these data in the conflict-free list of bookings. The Recording Service 400 will initiate recording of the booked event at the scheduled start time and for the specified duration. The Recording Service 400 gives the PIP, rating information and CGMS values to the DVR Writer at the scheduled event start time. The DVR Writer will store these metadata in the Metadata Indexer/Rasp service at recording time.

The Recording Service 400 updates the playback Manager 406 with events that are available for viewing. An event is available for viewing when recording begins unless the event is a network scheduled recording (push event). Push events are available for viewing only after the event is complete. The Recording Service 400 also supplies the Playback Manager 406 with the metadata to be associated with the event. The Playback Manager 406 stores these metadata until the event is deleted from the Server 304.

The Recording Service 400 receives APG updates via a callback mechanism. When an APG update is received the Recording Service 400 will 1) attempt to search for and book new events that match the recording requests; and 2) determine if the updated event information causes scheduling conflicts with existing bookings. New conflicts are passed to the Conflict Resolver 412 for conflict resolution. The Recording Service 400 will attempt to rebook lower priority events that are cancelled due to the conflict resolution process.

The Recording Service 400 manages all recorded material on the Server 304, removing content when the drive reaches capacity on a priority or quota basis, or when content is flagged to expire by a specific date. The Recording Service 400 notifies the Playback Manager 406 and DVR Writer at the time of content deletion allowing these services remove the metadata associated with the deleted event.

The Recording Service 400 controls all recordings and tuning requests using the CDI API. The Recording Service 400 controls the streaming of a pre-recorded or live event to a remote viewing device in a multi-TV household.

The Conflict Resolver 412 determines, or asks the viewer in some situations to determine, which set of conflicting activities (e.g., recording, Live-TV, etc.) should use HMC 312 resources (tuners, demultiplexer, disk space, etc) for a specified timeframe.

Standard Booking Algorithm

Bookings shall be allowed according to the following "standard booking algorithm." The HMC Server 304 or HMC Client 310 STB shall allow the viewer to book any event for recording, even if the event exceeds the specified ratings limit or the event exceeds the minimum hardware requirements for that STB on which the event is booked. The HMC Server 304 shall support the direct viewing of "Live TV" and shall bypass the Recording Service 400 for viewing Live TV on the HMC Client STBs via live television support 410 as shown in FIG. 4.

Playback of recorded content shall behave similarly to live viewing, with the following exceptions. Playback of recorded content via Playback Service 402 is allowed only if the viewer is a DVR subscriber, the HMC Server 304 or HMC Client 310 STB shall only allow the viewer to playback events that meet the minimum hardware requirements for that given STB, the HMC Server 304 or HMC Client 310 STB shall only allow the viewer to view an event using live television support 410 when that event meets the minimum hardware requirements for that STB, the HMC Server 304 or HMC Client 310 STB shall allow the viewer to transfer a currently playing recording to another STB only if that target STB meets the hardware requirements for that event, the HMC Server 304 or HMC Client 310 STB shall display an OSD when the minimum hardware requirements are exceeded, or other defined events. The Playback Service 402 acts as a verification standard to ensure that whichever Server 304 or Client 310 is requesting playback can support such a request, and if the request cannot be fulfilled, the user is queried as to how best to proceed such that the request can be fulfilled.

Playback of Recorded Content

The Playback service 402 shall play back events and services recorded via Recording service 400, and display a list of network-scheduled recorded events, as well as allow for purchase of those events requiring purchase via purchasing manager 404. Recorded content shall remain on the disk, whether on the viewer controlled portion of the disk or the network controlled portion of the disk, until delete conditions are met. Ratings of the recorded events are checked by the playback service 402 to ensure that the defined rating limit is not exceeded by the recorded event during playback. The rating can be checked continuously or periodically, and the user can override the rating limit by manual entry of a passcode or other method.

The purchase manager 404 shall only allow purchase of an event at playback if a PIP was stored at time of booking or recording. If there is a PIP stored with the event, it is sent to the CAM to determine viewing options when the viewer selects the event for viewing prior to starting playback.

If the event requires purchase, the user can purchase the event. The purchase manager 404 may comprise a spending limit, which can be set for a given client 310, group of clients 310, server 304 or group of servers 304, or for the entire system, as well as allowing the viewer to override the spending limit on a global or per-event basis using an OSD. Cancellation of the purchase can be done via the purchase manager 404 if cancellation is performed prior to a predetermined time or event that occurs during the purchased event, such as prior to viewing the non-free preview portion of the event. Multi-part events can be presented to the user via the purchase manager 404 to allow the multi-part event to be purchased individually or as a set.

Review Buffer

The HMC Server shall associate a review buffer 414 with live television support 410 for a live Television viewing session. A Live TV Viewing Session is associated with a client 310 or server 304 STB. The HMC Server 304 shall continue to record Live TV to the review buffer 414 even if no HMC Server 304 or HMC Client 310 STB is viewing content in that review buffer 414. There is typically an OSD displayed on monitor 206 to a viewer when that STB is in a Live TV viewing session and that tuner is to be tuned to a different channel. The STB shall attempt to utilize a free tuner for a channel change, if no free tuners are available an OSD is displayed. The STB shall continue recording to that tuner's review buffer 414 until the tuner is tuned to a different channel. The HMC Server 304 shall store only a single instance of the same event to the review buffer 414 if two or more Client 310 or server 304 STBs select the same event for recording when those STBs are tuned to the same channel. The HMC Server 304 STB shall store the review buffer 414 in the viewer partition of the disk. The HMC Server STB shall flush a review buffer 414 upon channel change.

Resource Allocation and Management

The Resource Manager 408 defines the resource pipelines required for specific activities and builds resource pipelines by acquiring or reserving resources for requesting activities, manages resource reservations to make the best use of available resources at any point in time, detects and mediates resource conflicts with the Conflict Resolver 412, and re-optimizes the set of reservations as the set of requests changes or resource distribution changes. The Resource Manager 408 grants or rejects resource requests to make the best use of available resources. The resource manager 408 internally maintains a non-conflicting resource reservation database to keep track of resource allocation across the whole network.

When a requesting activity needs a particular type of pipeline (e.g., for live-tv viewing, recording only, playback only, recording and playback), the Resource Manager 408 determines what resources are necessary to create or construct a pipeline that can support that request. The resource manager 408 also examines all pipeline resources available to determine whether or not the request can be satisfied.

When the Resource Manager 408 encounters a resource conflict during a viewer or service activity, it compiles a list of groups of resources, called "sufficient sets," and submits this list with a request to the Conflict Resolver 412 to get assistance in resolving the conflict. The Conflict Resolver 412 module, based on the nature of the activity and the nature of the conflict, returns either a list of sufficient sets sorted according to the conflict resolution policy or requests viewer interaction. Based on the information received from the Conflict resolver 412 module, the resource manager 408 will make a decision to allow the conflict-causing activity to proceed, after freeing up the required resource, reject the activity or to present the conflict to the viewer on monitor 206.

A sufficient set comprises one or more activities that conflict with the requesting activity over the timeframe of the requesting activity. Each Sufficient Set comprises a set of activities that if cancelled, would free sufficient resources to resolve the resource conflict for the requesting activity.

As the set of requests changes (recording requests are scheduled or canceled, or playback sessions are initiated or terminated), the Resource Manager 408 automatically updates the set of reservations. Similarly, as resources are added to or removed from the network, the Resource Manager 408 reevaluates and reschedules the set of reservations. Resources acquired for an activity are released by the activity when the activity is canceled or completed, with the exception of the disk storage resource, which is released only when the file is deleted.

The Resource Manager 408 checks whether an activity can share the same resource with another activity, and if so, will allocate only one resource for both activities. For example, when two event recordings occur on the same channel and the two events overlap due to recording extensions, the Resource Manager 408 recognizes that the overlap exists on a single channel and allocates only one tuner to record both events. That is, the resource Manager 408 should not allocate a second tuner for recording when the overlap begins since both events are on the same channel.

Resource Type and Pipelines

Resources (device and services) discovered by the resource manager 408 may operate as managed or unmanaged resources. Those resources that provide limits to system behavior (such as tuners, the number of which determines an upper limit on the number of concurrent recordings) are treated as managed resources. Managed resources are registered with the Resource Manager 408, and their use is scheduled (reserved and acquired) through Resource Manager 408. Unmanaged resources, on the other hand, are registered with the system but are not managed by the Resource Manager. For example, tuners and disk space are managed resources, registered with the Resource Manager 408 and scheduled for use to satisfy recording requests. Memory is not registered with the Resource Manager 408 and is not scheduled for use.

The processing of a broadcast service requires the use of a set of hardware devices, which is typically called a TV-pipeline. Typically, a TV pipeline is a grouping of the following resources:

Tuner, Demultiplexer, SCID/PID Filter, Remultiplexer, Video Decoder Device, Audio Decoder Device, Disk Space, Disk Bandwidth, Network bandwidth and CAM.

Typically, the Resource Manager 408 is constrained to manage access to the tuner, demultiplexer, remultiplexer (only used for recording and live viewing), SCID/PID filters, disk bandwidth, network bandwidth, and disk space. The other resources including video decoder, audio decoder and the key generation capacity of CAM are assumed to be sufficient and non-conflicted in any case.

the Resource Manager 408 accepts resource requests for a specified timeframe, typically during three specific events during the life-cycle of an server 304 or client 310 activity. These times are the resource scheduling time, the resource pre-acquisition time, and the resource acquisition time.

All three of these events occur for some types of activities such as future one-time recordings, future multiple-event recordings, etc. These types of activities must request resources from the Resource Manager 408 at all three events. Other types of activities, such as live TV viewing, cannot be scheduled and/or pre-acquired. These types of activities require resources to be immediately acquired or pre-acquired n minutes before the start time.

A resource scheduling request is used to attempt to reserve resources for a future activity. For example, a one-time recording request for next week Wednesday will require resources to perform that recording.

A resource pre-acquisition request is used to attempt to pre-acquire resource n-minutes prior to the start time of a requesting activity, and make sure there is no resource conflict occurring at this resource Pre-Acquisition event. If there are no conflicts, a "weak-binding" between the pre-acquired resource and the requesting activity is created. For example, a previously scheduled one-time recording pre-acquisition request for 7 pm tonight will re-confirm its resource reservation by 6:55 pm and the weak-binding will trigger a "2 minute warning" OSD on the UI.

A resource is acquired at the start time of a requesting activity and is strong-binded to that activity. For example, a live-viewing session request for immediate-possession of a live-viewing pipeline is hard-binded and cannot be used for any other activity without intervention by the user.

Resource Request and Reservation

Figure 5:
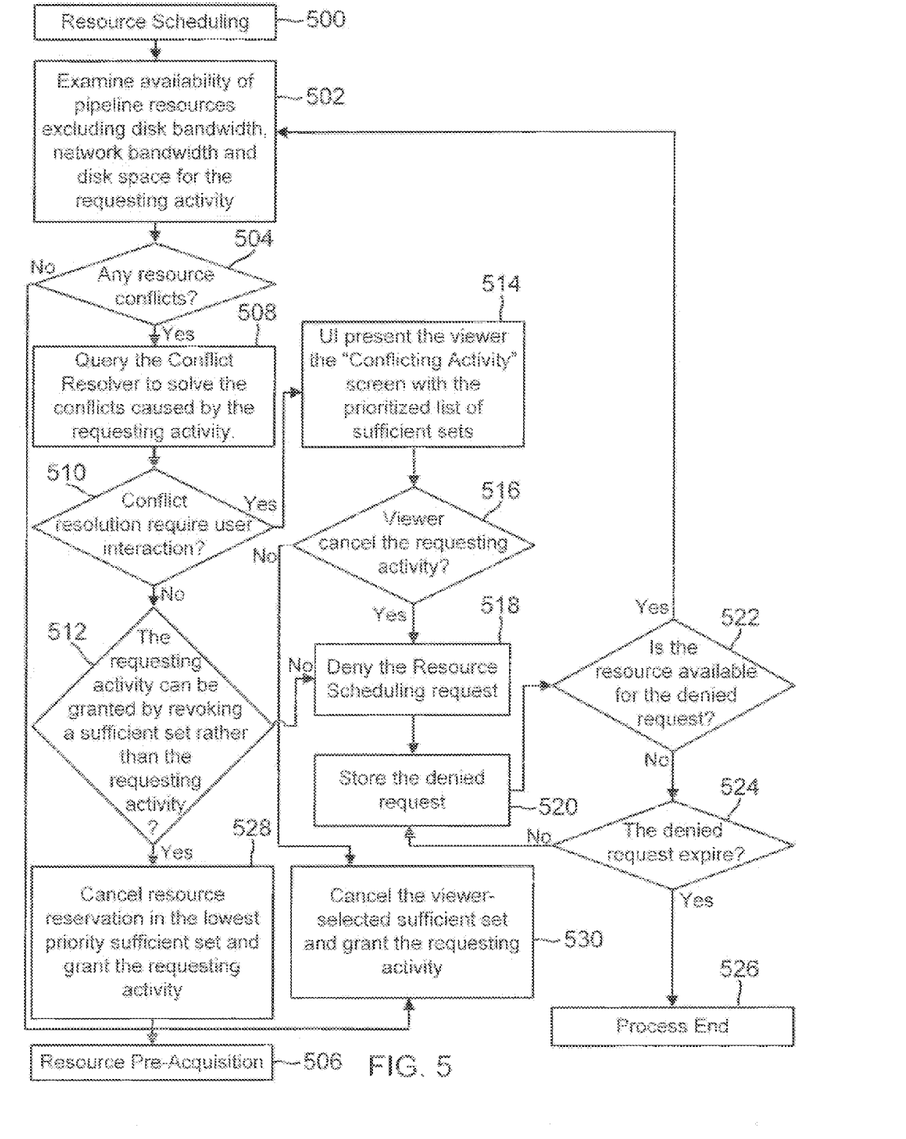
FIGS. 5-7 illustrate system processing for managing resource requests and reservations as performed by the present invention.
Figure 6:
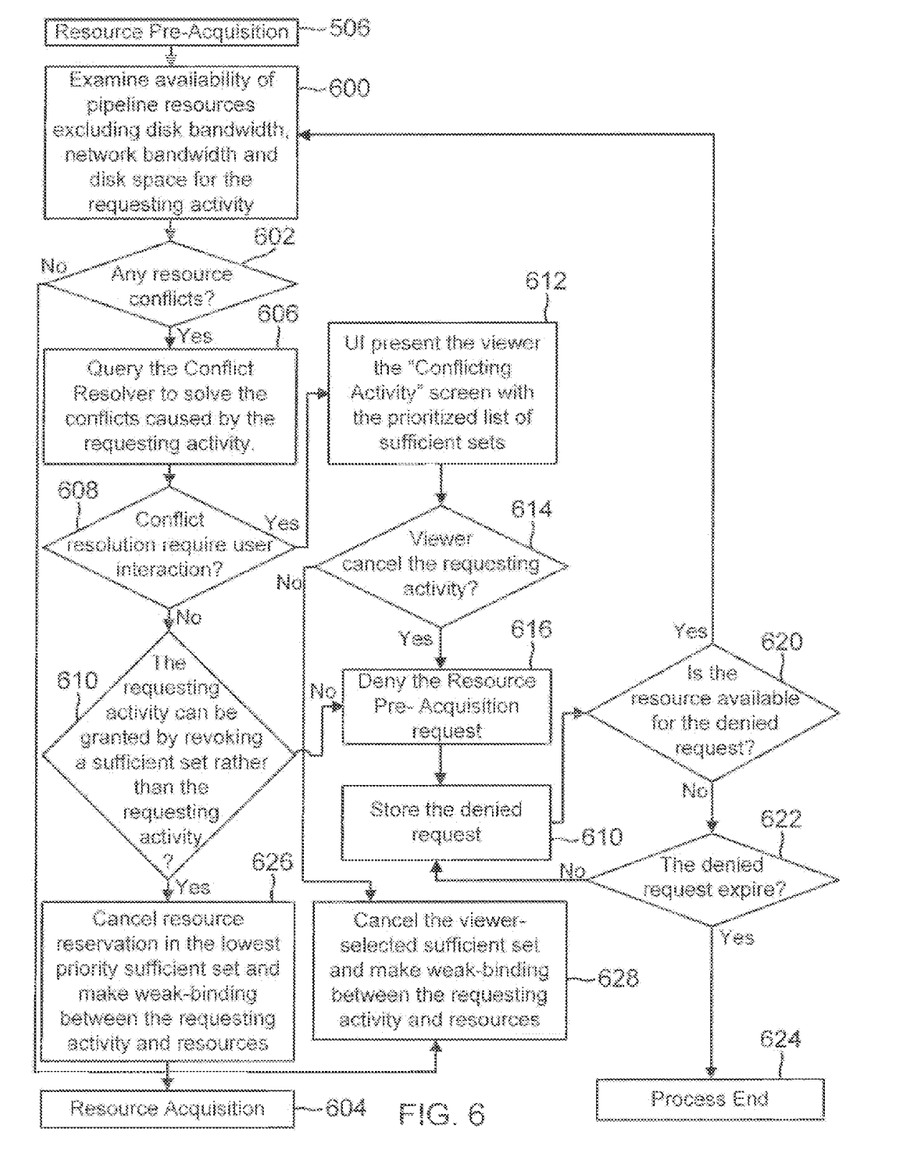
Figure 7:
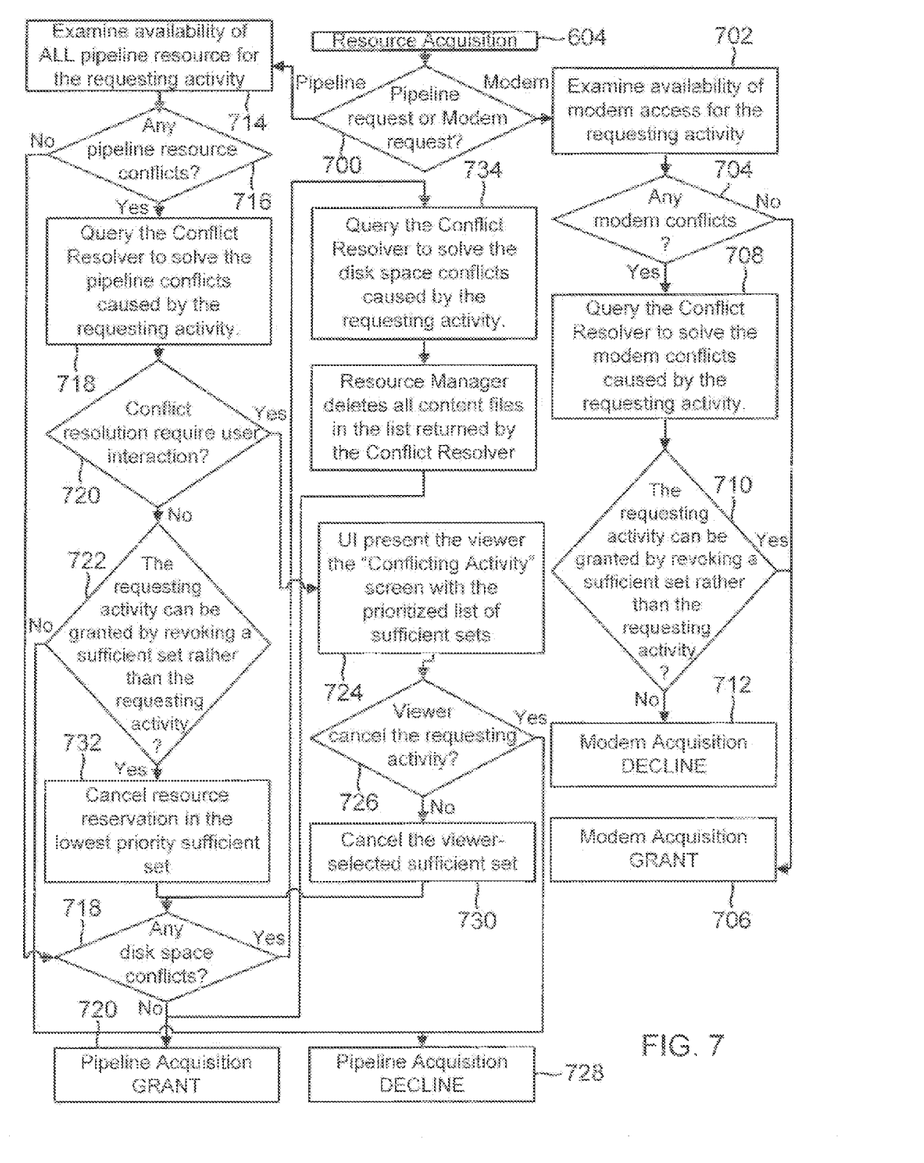

A high-level summary of the system processing of Resource Manager for managing resource requests and reservations is provided as flow diagrams is provided in FIGS. 5-7.

Resource Scheduling

FIG. 5 illustrates block 500, which indicates that the resource manager 408 is performing a resource scheduling task. In block 502, the resource manager 408 examines the availability of the resources, not including disk bandwidth, or other network bandwidth or disk space. After this review, decision block 504 is entered to see if there are any conflicts.

If there are no conflicts found in decision block 504, the system moves on to resource pre-acquisition block 506. If there are conflicts, conflict resolver 412 is called in block 508 to determine where the conflicts are and how to resolve them.

Initially, conflict resolver 412 must determine if user interaction is required, which is done in block 510. If no user interaction is needed, control passes to block 512. If user interaction is required, conflict resolver 412 presents a conflicting activity screen to the user in block 514, along with a prioritized list of sufficient sets to perform all the requested activities, so that the user can decide which activities are desired.

If the user cancels the requested activity of block 500 in block 516, control passes to block 518, where the resource scheduling request is denied. This request is then stored in memory in block 520.

The resource manager 408 then determines if the resource needed for the denied request is available in block 522, and if not, pass control to block 524, where resource manager 408 determines if the denied request has expired, typically via elapse of time. If not, resource manager 408 continues to monitor the denied request, just incase some other changes to the system are made in the future, until the request does expire, in which case, the resource scheduling request of block 500 ends in block 526. If the resource becomes available in block 522 because of some other change in the system, control passes back to block 502, and the resource manager 408 and conflict resolver 412 work to determine if the request can now be granted.

Returning to block 510, if the conflict can be resolved by the conflict resolver 412 without user intervention, conflict resolver 412 must determine, in block 512, whether the requested activity can be granted by revoking a sufficient set rather than the requested activity itself. If so, then control passes to block 528. Where the conflict resolver 412 cancels resource reservations for other events, typically using a priority schema, to allow the requested activity of block 500 to go forward. Once these reservations are canceled or otherwise rearranged, resource pre-acquisition in block 506 can take place for the requested activity.

If the conflict resolver 412 cannot rearrange or revoke the sufficient sets to grant the requested activity of block 500, control passes to block 518, and the process continues as described above with respect to blocks 518-524.

Returning to block 516, if the viewer does not cancel the requested activity, control passes to block 530, where resource manager 408 grants the requested activity in block 500 and cancels or otherwise arranges the outstanding resources. Control then passes to block 506 for pre-acquisition.

Resource Pre-Acquisition

In FIG. 6, pre-acquisition block 506 passes control to block 600, which determines the availability of pipeline resources for the network activity. Decision block 602 determines if there are any resource conflicts. If not, control passes to block 604, where resources are allocated for the request.

If there are conflicts, conflict resolver 412 is called in block 606 to determine where the conflicts are and how to resolve them.

Initially, conflict resolver 412 must determine if user interaction is required, which is done in block 608. If no user interaction is needed, control passes to block 610. if user interaction is required, conflict resolver 412 present a conflicting activity screen to the user in block 612, along with a prioritized list of sufficient sets to perform all the requested activities, so that the user can decide which activities are desired.

If the user cancels the pre-acquisition activity of block 506, initially requested in block 500, in block 614, control passes to block 616, where the resource scheduling request is denied. This request is then stored in memory in block 618.

The resource manager 408 then determines if the resource needed for the denied request is available in block 620, and if not, passes control to block 622, where resource manager 408 determines if the denied request has expired, typically via elapse of time. If not, resource manager 408 continues to monitor the denied request, just incase some other changes to the system are made in the future, until the request does expire, in which case, the resource scheduling request of block 500 ends in block 624. If the resource becomes available in block 620 because of some other change in the system, control passes back to block 600, and the resource manager 408 and conflict resolver 412 work to determine if the request can now be granted.

Returning to block 608, if the conflict can be resolved by the conflict resolver 412 without user intervention, conflict resolver 412 must determine, in block 610, whether the requested activity can be granted by revoking a sufficient set rather than the requested activity itself. If so, then control passes to block 626. Where the conflict resolver 412 cancels resource reservations for other events, typically using a priority schema, to allow the requested activity of block 500 and pre-acquisition activity of block 506 to go forward.

If the conflict resolver 412 cannot rearrange or revoke the sufficient sets to grant the requested activity of block 500 and pre-acquisition activity of block 506, control passes to block 616, and the process continues as described above with respect to blocks 616-622.

Returning to block 614, if the viewer does not cancel the requested activity, control passes to block 628, where resource manager 408 cancels the viewer-selected sufficient set and weak-binds the requested activity and the allocated resources that were requested activity in block 500. Control then passes to block 604 for resource acquisition.

Resource Acquisition

FIG. 7 describes the flow of a resource acquisition event 604. Initially, decision block 700 is entered, which determines whether the acquisition of resources came from a pipeline request or a modem request. If a modem request, control passes to block 702, where the availability of modem access for the requesting activity is examined. Control then passes to block 704, where modem conflicts are determined. If there are no modem conflicts, control passes to block 706, where the resource acquisition is granted.

If there are modem conflicts, the conflict resolver 412 is queried in block 708 to solve the conflicts that are present. If the conflicts can be resolved by revoking a sufficient set rather than the requesting activity in block 710, the request is granted in block 706; otherwise, the request is denied in block 712.

If block 700 determines that it is a pipeline request, then block 714 examines the availability of all pipeline resources. If there are no pipeline resource conflicts found in block 716, control passes to block 718 to determine if there are any disk space conflicts. If there are no disk space conflicts, the pipeline acquisition is granted in block 720.

If there are pipeline resource conflicts, conflict resolver 412 is called in block 718 to determine where the conflicts are and how best to resolve them.

Initially, conflict resolver 412 must determine if user interaction is required, which is done in block 720. If no user interaction is needed, control passes to block 722. If user interaction is required, conflict resolver 412 presents a conflicting activity screen to the user in block 724, along with a prioritized list of sufficient sets to perform all the requested activities, so that the user can decide which activities are desired.

If the user cancels the resource acquistion activity 604, which was pre-acquistion activity of block 506, initially requested in block 500, in block 726, control passes to block 728, where the resource scheduling request is denied.

If the user does not cancel the requesting activity, the viewer selected sufficient set is canceled in block 730, and control passes to block 718.

Returning to block 720, if the conflict can be resolved by the conflict resolver 412 without user intervention, conflict resolver 412 must determine, in block 722, whether the requested activity can be granted by revoking a sufficient set rather than the requested activity itself. If so, then control passes to block 732, where the conflict resolver 412 cancels resource reservations for other events, typically using a priority schema, to allow the requested activity of block 500 and pre-acquisition activity of block 506 to go forward. Control then passes to block 718.

If the conflict resolver 412 cannot rearrange or revoke the sufficient sets to grant the requested activity of block 500 and pre-acquisition activity of block 506, control passes to block 728, and the pipeline acquisition is denied.

If block 718 determines that there are disk space conflicts, the conflict resolver 412 is again called to resolve the conflict in block 734, and in block 736, resource manager 408 deletes content files as necessary and requested by the conflict resolver 412, to allow the acquisition 604 to go forward in block 720.

Resource Release

When activity is canceled or completed, its resources will be released and become available for other uses. The resources acquired for live viewing or playback of a recorded program will be released when the viewing session initiates a superseding usage by starting another playback or by tuning to another channel. The Resource Manage 408 is notified that the resource is no longer being used, or if it is a managed resource, the resource manager 408 knows that the resource is no longer being used, and can schedule that resource to be used elsewhere in the system.

Weak Binding

Weak binding refers to a resource reservation granted by the Resource Manager 408 to a requesting activity during pre-acquisition time (n-minutes before the actual start time of the activity) such that the any activity that is using or attempts to use the weak-binding resource will be warned but will not be pre-empted until the resource is strongly bound to the requesting activity. For example, the Resource manager 408 will trigger the UI to display a "2 minute warning" OSD if a live viewing or playback activity is currently using weak-binding resource or attempts to use weak-binding resource during the 2 minute period.

Conflict Resolver

The Conflict Resolver 412 allows control over which course of action to take when the HMC 312 activities encounter resource conflicts in a manner independent from the rest of the system. These conflicts may arise when concurrent viewer or service activities (live TV, recording, download, or playback) require more resources than are available in the HMC 312.

When the HMC 312 encounters a resource conflict during a viewer or service activity, it submits a request to the Conflict resolver 412 to get assistance in resolving the conflict. The Conflict Resolver 412 module, based on the nature of the activity and the nature of the conflict, compiles a list of actions that can be taken to resolve the conflict. Based on the information received from the Conflict Resolver 412 module, the system will make a decision to allow the conflict-causing activity to proceed, after freeing up the required resource, reject the activity or to present the conflict to the viewer via the UI.

Trick Mode/Trick Play

The Set Top Box (STB) (also referred to as HMC 312 and/or client IRD 310 herein) shall support Pause/Play Trick Play Bar functionality. The STB displays the Trick Play Bar when any Trick Play Bar functions are requested by the viewer. The STB supports Fast forward and rewind speeds of: 2×, 6×, 12×and 30×. The STB shall not timeout display of the Trick Play Bar in FF or REW mode.

Dedicated Tuner for Network Administration Functions

In addition, there can be a tuner within the HMC 312 that cannot be user controlled, e.g., by commanding the tuners by viewer channel request. Such a tuner is commonly referred to as a "network tuner." A network tuner is not meant to be under user control, but instead, is designed to be under service provider control. A network tuner would be available to all client IRDs 310, server IRDs 304, and PVRs regardless of the channel allocations made by FTM 300.

A network tuner typically provides emergency audio/video information, or is otherwise a dedicated chain of tuner, demodulator, etc. that the service provider can use to provide information other than viewer channels to each IRD 310. Further, a network tuner can be present in either the FTM 300 or in the IRD 304/310 or PVR without departing from the scope of the present invention.

Such a dedicated tuner can be used to provide channel guide information, record content desired by the service provider on the recording device, or for other functions as needed or desired by the service provider.

Conclusion

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching.

The present invention discloses systems for delivering satellite video signals for display on a monitor. A system in accordance with the present invention comprises an antenna, a server receiver, coupled to the antenna, and at least one client receiver, coupled to the server receiver, wherein the client receiver sends commands to the antenna and receives signals from the antenna through the server receiver.

It is intended that the scope of the invention be limited not by this detailed description, but rather by the claims appended hereto and the equivalents thereof. The above specification, examples and data provide a complete description of the manufacture and use of the composition of the invention. Since many embodiments of the invention can be made without departing from the spirit and scope of the invention, the invention resides in the claims hereinafter appended and the equivalents thereof.

What is claimed is:

1. A system for processing media content for display on a monitor, comprising:
   a home media center comprised of a server receiver, wherein the home media center:
   acts as a central location for recording, distribution, and scheduling of tasks and system resources;
   receives a client request from a first client receiver;
   receives a legacy request from a first legacy receiver;
   tunes, using a first set of tuning parameters, to a first satellite data stream that is encoded in a first coding technology;
   tunes, using a second set of tuning parameters, to a second satellite data stream that is encoded in a second coding technology;
   processes the client request and either fulfills the client request or informs the first client receiver that the client request cannot be fulfilled, wherein the home media center utilizes the first coding technology to provide video, audio, and data services in the first satellite data stream to the first client receiver; and
   processes the legacy request, wherein the home media center utilizes the second coding technology, that is different from the first coding technology, to provide video, audio, and data services in the second satellite data stream to the first legacy receiver;

the first client receiver, coupled to the home media center, wherein the first client receiver:
transmits a client request to the home media center;
receives audio, video and data from the home media center; and
displays the received audio, video and data on a first display device; and the first legacy receiver, communicatively coupled to the home media center, wherein the first legacy receiver:
transmits a legacy request to the home media center;
receives audio, video and data from the home media center; and
displays the received audio, video and data on a second display device.

2. The system of claim 1, further comprising:
one or more second client receivers, wherein the home media center allocates resources to the first client receiver and the one or more second client receivers based on requests received from the first client receiver and the one or more second client receivers.

3. The system of claim 1, wherein the client request comprises a request for recording a media program.

4. The system of claim 1, wherein the client request comprises a request for viewing a specific channel.

5. The system of claim 1, wherein the server receiver further comprises a digital video recorder that is configured to record a media program.

6. The system of claim 1, wherein:
the first coding technology comprises an advanced modulation scheme; and
the second coding technology comprises a proprietary format utilized by the legacy receiver based on a legacy stream type.

7. The system of claim 6, wherein:
the proprietary legacy stream type comprises a Quarternary Phase Shift Keying (QPSK) stream; and
the advanced modulation scheme includes low density parity check (LDPC) coding as part of an A3 stream type.

8. The system of claim 1, wherein the home media center resolves any conflicts between multiple client requests from the first client receiver and a second client receiver.

9. A method for processing media content for display on a monitor, comprising:
receiving, in a home media center, a client request from a client receiver, wherein the home media center comprises a server receiver and acts as a central location for recording, distribution, and scheduling of tasks and system resources;

receiving, in the home media center, a legacy request from a first legacy receiver;

tuning, using a first set of tuning parameters, to a first satellite data stream that is encoded in a first coding technology;

tuning, using a second set of tuning parameters, to a second satellite data stream that is encoded in a second coding technology;

processing, in the home media center, the client request and either fulfilling the client request or informing the first client receiver that the client request cannot be fulfilled, wherein the home media center utilizes the first coding technology to provide video, audio, and data services in the first satellite data stream to the first client receiver;

processing, in the home media center, the legacy request, wherein the home media center utilizes the second coding technology, that is different from the first coding technology, to provide video, audio, and data services in the second satellite data stream to the first legacy receiver.

10. The method of claim 9, further comprising:
allocating resources, via the home media center, to the first client receiver and to one or more second client receivers based on requests received from the first client receiver and the one or more second client receivers.

11. The method of claim 9, wherein the client request comprises a request for recording a media program.

12. The method of claim 9, wherein the client request comprises a request for viewing a specific channel.

13. The method of claim 9, wherein the server receiver further comprises a digital video recorder that is configured to record a media program.

14. The method of claim 9, wherein:
the first coding technology comprises an advanced modulation scheme; and
the second coding technology comprises a proprietary format utilized by the legacy receiver based on a legacy stream type.

15. The method of claim 14, wherein:
the proprietary legacy stream type comprises a Quarternary Phase Shift Keying (QPSK) stream; and
the advanced modulation scheme includes low density parity check (LDPC) coding as part of an A3 stream type.

16. The method of claim 9, further comprising:
resolving, in the home media center, any conflicts between multiple client requests from the first client receiver and a second client receiver.

* * * * *